Dec. 14, 1965  J. B. WHITNEY  3,222,775
METHOD OF BONDING SHEETS OF METAL
Filed Sept. 12, 1960

*INVENTOR.*
JOHN B. WHITNEY
BY
*John H. Widdowson*
ATTORNEY

United States Patent Office 3,222,775
Patented Dec. 14, 1965

3,222,775
METHOD OF BONDING SHEETS OF METAL
John B. Whitney, Wichita, Kans., assignor to Boeing Company, a corporation of Delaware
Filed Sept. 12, 1960, Ser. No. 55,292
8 Claims. (Cl. 29—497)

This invention relates to bonding materials. In a more specific aspect it relates to new methods for bonding members, and to the products resulting therefrom. In still a more specific aspect this invention relates to methods for bonding two members together, and more particularly to a bonding method utilizing ceramic adhesives and brazing alloys together to bond two metallic members.

Various methods for bonding metal members together are known in the art. Basically, these include brazing or welding techniques, and in some instances the use of a ceramic material in the nature of enameling. The prior art methods present a number of problems, particularly at higher temperatures where the strength of brazed joints decrease in strength as the temperature of use rises. Also, common welding techniques present localized stress and strain problems at the weld which often becomes defective or weakened as the two welded members are subjected to temperature change. The ceramic adhesive used between two members have relatively good heat properties, but have not proved entirely satisfactory due to the brittleness of ceramic materials, and water solubility of some of the best ceramic adhesives. Also, the need for protective atmospheres in order to produce a brazed joint with any strength at all has been eliminated.

In accordance with the present invention a new method of bonding two members together is provided which overcomes many of the problems and disadvantages of the prior art techniques. More specifically, the present method utilizes a combination of ceramic and brazing materials which combine the more desirable properties of each to provide an improved joint which has the temperature advantages of the ceramic material and the ductility of the brazing alloy. The use of protective atmospheres required in firing brazing materials alone can be dispensed with, which represents a material costs savings. Also, the use of the ceramic material, which gains in strength up to a maximum as the use temperature increases, permits a joint to be made which is satisfactory at higher temperatures than when the brazing alloy alone is used.

A preferred specific embodiment of the new method of the invention includes the steps of placing the ceramic forming materials and brazing materials between or on the surfaces of the members to be bonded. This is accomplished in one embodiment of the invention by applying a frit in suspension to one or both of the faces of the members to be bonded and allowing the ceramic adhesive to dry. The brazing alloy is then placed between the members. The members are then held together, preferably under pressure, and fired at a temperature and for a period of time sufficient to mature the ceramic forming materials and brazing materials. The firing can be accomplished in air, without the necessity of the protective atmosphere used in prior art methods. Any suitable ceramic and brazing material can be used. The ceramic and brazing materials preferably are those known to the art.

Another preferred specific manner of practicing the method of the invention is to grind the frit, or mix and grind the frit forming materials, and grind the brazing alloy materials, and mix them together while in the powdered form. The resulting mixture of powders is then applied to or placed between the surfaces of the members to be bonded in any suitable manner, such as by making a slurry of the powders and a brazing alloy cement. The members are then placed in contact and fired.

In a still further preferred embodiment of the new method of the invention the brazing alloy material can be ground and mixed with a frit or frit forming materials in suspension and then brushed on or otherwise applied to the contacting faces of the members, which are then placed into contact and fired.

When metallic members are being bonded, they are preferably cleaned in a manner known to the art, such as by vapor degreasing with a volatile hydrocarbon material and immersing in an alkaline cleaner, such as trisodium phosphate, caustic, etc.

Accordingly, it is an object of this invention to provide a new bonding method.

It is another object of this invention to provide new bonded articles.

Another object of the invention is to provide a new method of bonding two members together by use of ceramic and brazing materials.

Another object of the invention is to provide a new method of bonding two members together in which a ceramic material is applied to the members and a brazing alloy is then placed between them and the structure fired to provide new bonded articles.

A still further object of the invention is to provide a new method of bonding two members by which the strength of the joint is maintained as the use temperature increases.

A further object of the invention is to provide a new bonding method using ceramic materials to provide new articles in which a more ductile joint is obtained.

Another object of the invention is to provide a new and inexpensive method of bonding two members together.

A still further object of the invention is to provide a new method of bonding two members together which utilizes the desirable properties of ceramic and brazing material.

Various other objects, advantages and features of the invention will become apparent from the following description, taken in connection with the accompanying drawings, in which.

Figure 1:
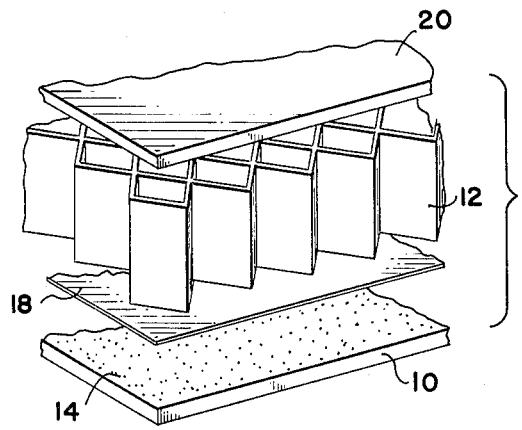
FIG. 1 is an exploded view of the joining of a flat surface and a honeycomb structure in accordance with the present invention.

The following is a discussion and description of preferred specific ways of practicing the new method of the invention and the new articles of the invention, such being made with reference to the drawings whereon the same reference numerals are used to indicate the same or similar parts and/or structure. It is to be understood that such discussion and description is not to unduly limit the scope of the invention.

A preferred method of the invention generally consists of the combining of a ceramic adhesive and a brazing alloy to bond two members together. The ceramic and brazing materials are used in various forms in practicing the invention. The ceramic material can be applied to the surface of the members to be bonded and the brazing material placed therebetween prior to firing, or the ceramic and brazing materials can be mixed and applied together to one or both of the surfaces to be bonded.

The ceramic adhesives preferable and suitable for use with this invention are made up of a frit as the major ingredient together with various mill additions, or frit forming materials can be used with the mill additions, with the firing being accomplished all at once. When used, the frit is preferably made by fritting processes and techniques common to the ceramic industry, and the composition of the frit is formulated in order to provide a coating which, when fired, will not only bond but desirably will inhibit or prevent oxidation of the members being bonded and will be resistant to moisture, acids, alkalies, and organic firing fuel or solvents.

Desirably, the frit is basically an alkaline borosilicate glass composed of $B_2O_3$, $SiO_2$ and $Na_2O$. Other alkaline and alkaline earth oxides such as lithium oxide, barium oxide, calcium oxide, potassium oxide, and magnesium oxide and the like can, if desired, be added to improve the properties of the frit. The alkaline and alkaline earth oxides are usually added as carbonates. The nitrates of sodium and potassium can be used either alone or with the carbonates.

Glass forming oxide, such as $P_2O_5$, and the like, can be added to further modify the glass, if desired. Fluorine can conveniently be introduced into the frit by adding sodium silico fluoride, potassium silico fluoride, lithium fluoride, calcium fluoride or other fluorine containing chemicals. Some of the fluorine will normally react with the silica during the fusing process and leave the melt as the gas silicon tetrafluoride. It has been found that retention of at least a portion of the fluorine in the glass has proved to be particularly beneficial. Adherence promoting oxides such as cobalt oxide, nickel oxide, manganese oxide and copper oxide can also be added if desired.

The composition, in percentage by weight, of several frits which have been used and found suitable in ceramic adhesives used in practicing the invention are as follows:

| | Percent |
|---|---|
| Boric acid | 66.2 |
| Sodium nitrate | 9.0 |
| Powdered quartz | 24.8 |
| Boric acid | 64.4 |
| Sodium silico fluoride | 1.9 |
| Sodium nitrate | 8.0 |
| Powdered quartz | 25.8 |
| Boric acid | 64.6 |
| Barium carbonate | 1.9 |
| Sodium nitrate | 5.7 |
| Sodium silico fluoride | 1.9 |
| Powdered quartz | 25.8 |
| Borax | 11.3 |
| Boric acid | 54.4 |
| Powdered quartz | 23.8 |
| Sodium nitrate | 3.2 |
| Lithium fluoride | 7.3 |

Commercial frit compositions such as Chicago Vitreous Corporation's 1084 and 366M have also been used and found satisfactory.

The frit compositions are preferably melted in the manner common in the industry, when the fired frit is used with the brazing material, and they are then quenched preferably by pouring the molten glass between revolving water-cooled rolls. Water quenching can also be used, if desired.

The fired frit is then prepared for application to the articles to be bonded preferably by grinding the frit together with other materials in a porcelain ball mill to form the adhesive. When the frit composition is used without prefiring, it is desirably well milled and mixed with the mill additions. The materials charged into the porcelain ball mill are generally referred to collectively as a "mill addition." Representative but not limiting mill additions which have been used in practicing the method of the invention are as follows:

| | Parts by weight |
|---|---|
| Frit | 100 |
| Syloid 244 | 2 |
| Water | 150 |
| Frit | 100 |
| Water | 130 |
| Syloid 244 | 2 |
| $NaNO_2$ | 0.5 |
| $MoO_3$ | 0.73 |

Syloid 244 is a brand name of the Davison Chemical Co. of Baltimore, Maryland for a line of finely divided silica jells, the Syloid acting as an emulsifier.

The ceramic adhesive, when removed from the ball mill, is preferably a heavy creamy consistency and is usually referred to in the art as a "slip."

The mill additions are preferably ground to a fineness where there will be no material retained on a 200 mesh screen when 50 milliliters of slip are washed through the screen by a stream of running water.

The brazing alloy materials preferably used with the invention include alloys of metals suitable for brazing by standard practices and techniques common to the industry. One class of brazing alloys suitable for use with the invention include the alloys having as the major ingredient the noble metals, such as silver, gold and palladium. Indium and/or lithium are provided as a part of the brazing alloys in a lesser amount but in sufficient quantity to promote wetting and/or bonding to the ceramic frit. The frit is considered to function as a flux. The following representative but not limiting alloys have been used and found suitable in practicing the method of this invention:

| | Percent |
|---|---|
| Silver | 84.5 |
| Copper | 7.4 |
| Indium | 5.5 |
| Palladium | 2.4 |
| Lithium | 0.2 |
| Silver | 92.5 |
| Copper | 7.3 |
| Lithium | 0.2 |
| Silver | 92.7 |
| Copper | 7.17 |
| Lithium | 0.16 |

The brazing alloys are usually available in the form of foil or expanded foil. Such foil or powdered form is suitable.

Other brazing alloys which are particularly suitable for use with the invention include those usually intended for high temperature use, these alloys normally having as their ingredients various mixtures including nickel, chromium, silicon, boron, cobalt, titanium, iron, and manganese. Suitable alloy compositions of this class which have been used in practicing the invention are as follows:

| | Percent |
|---|---|
| Silicon | 4.50 |
| Boron | 2.90 |
| Carbon | 0.06 |
| Nickel | Balance |
| Titanium | 0.75 |
| Silicon | 4.00 |
| Boron | 3.30 |
| Iron | 1.80 |
| Nickel | Balance |
| Chromium | 15.00 |
| Boron | 3.40 |
| Manganese | 0.15 |
| Nickel | Balance |

When using the alloys in the form of powders, it has been found from use that the strength of the joint increases as the fineness of the powder increases, that is, alloy powders of less than 325 mesh being better than those powders of 150 mesh.

In practicing the method of the invention, the metallic members to be bonded preferably are first cleaned and degreased in a suitable manner to remove residual greases and the like which usually are on the metals when they come from the mill. Various methods are known to the art for cleaning the metal, and any cleaning step which removes mill greases would be satisfactory for use with the metals here concerned. One method used in practicing the invention is to first clean the members by vapor degreasing with a suitable liquid, such as inhibited trichlorethylene. The metallic member is then preferably cleaned with a suitable alkaline cleaner, such as caustic or ammonium phosphate, or a solution of trisodium phosphate, or the like. The last cleaning step is immersive type cleaning in which the metal is dipped in a hot solution of the cleaner. The metals can also be cleaned by various acids, alkalis, inorganic salts and mixtures of these compounds under varying conditions which are well known in the art. A thin coat of a ceramic adhesive of the type described is then placed on the surface of one or both of the members to be bonded in any suitable manner, such as by spraying or brushing. The adhesive is then allowed to dry and the brazing alloy in the form of a foil or expanded foil is placed between the members to be bonded. The members are then placed into contact and are held in this position by pressure applied to the members by weight, vacuum or other suitable means. The system is then placed in a furnace and fired at a temperature and for a time sufficient to bond the members. Temperature of from 1600 to 2100 degrees Fahrenheit from 5 to 30 minutes will ordinarily be satisfactory to complete the bonding of the members. While the temperature and time for firing is variable within the skill of the art, it has been found desirable to use a temperature and time which approximates that of the optimum brazing temperature for the brazing alloy used in any particular instance.

Figure 2:
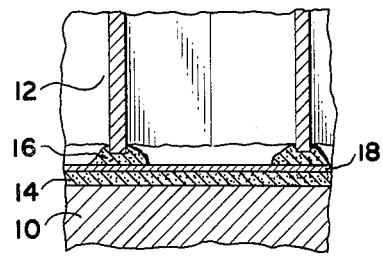
FIG. 2 is an enlarged, partial cross section view of the structure shown in FIG. 1 ready for firing.

FIGS. 1 through 4 of the drawings illustrate the method of bonding described thereinabove. In FIGS. 1 and 2 of the drawings, a metallic plate 10 is to be bonded to the honeycomb metallic member 12. The metal members are first cleaned and degreased. A ceramic adhesive, prepared in the manner hereinbefore described, is coated on the member 10 and/or 12, such as by spraying or brushing. The ceramic adhesive is shown at 14 and 16 on the plate 10 and honeycomb 12 respectively. After the adhesive has dried a layer of brazing alloy in the form of a foil as shown at 18 is placed between the plate 10 and honeycomb structure 12. The brazing alloy foil 18 preferably covers the entire surface to be bonded. The member 18 can be either a sheet of foil or it can be expanded foil. Plate 10 and honeycomb structure 12 are then held in position by weights or vacuum and the structure is fired in a furnace without the need of a protective atmosphere. The ceramic material is enlarged in the drawing and is preferably a relatively thin coat in practice, such as one to ten mills. The top portion of the honeycomb structure 12 can, if desired, be bonded to a second metallic plate 20 by the same process and fired at the same time.

Figure 3:
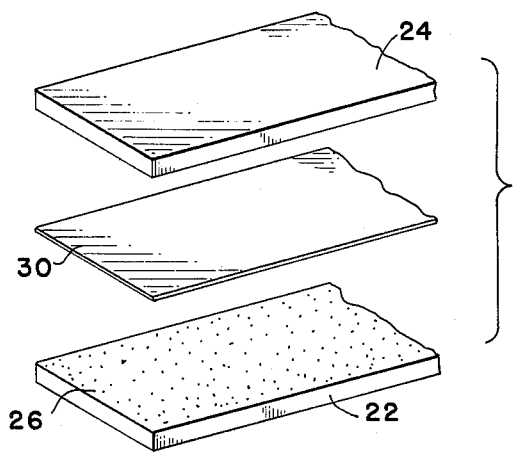
FIG. 3 is an enlarged, exploded view of the joining of two flat surfaces in accordance with the present invention.
Figure 4:
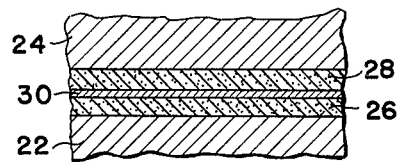
FIG. 4 is an enlarged partial cross section view showing the plates of FIG. 3 in position for firing.

FIGS. 3 and 4 illustrate the method of bonding previously described when applied to two metallic plates 22 and 24. The plates 22 and 24 are cleaned and coated with the ceramic adhesive 26 and 28. The adhesive is allowed to dry and a sheet of grazing alloy 30 is then placed between the members, preferably covering the entire surface to be bonded. The structure is maintained in this relation by weights or vacuum and fired to mature the ceramic adhesive and the brazing alloy.

The following examples illustrate a manner of practicing the invention, and are given to illustrate and not to limit the invention.

*Example I*

Two panels of steel were cleaned by vapor degreasing using inhibited trichloroethylene and further cleaned by immersing in an alkaline cleaner. A frit was prepared from a composition consisting of 66.2% boric acid, 9.0% sodium nitrate, and 24.8% of powdered quartz, by smelting and grinding. A ceramic adhesive was prepared by using 100 parts by weight of the powdered frit with 150 parts by weight of water and 2 parts by weight of Syloid 244. A thin coat of the ceramic adhesive was sprayed on the panels. The adhesive was allowed to dry and a silver brazing alloy in the form of foil having the composition of 92.5% silver, 7.3% copper and 0.2% lithium was placed between the sheets. The brazing alloy sheet or foil was of such size as to cover the entire surface to be bonded. This system was then placed in a furnace in an air atmosphere and held in position by using 25 p.s.i. bond pressure supplied by weights. The system was fired at 1725 degrees F. for 20 minutes. When removed from the furnace the panels were firmly bonded.

*Example II*

Two panels of steel were vapor degreased, cleaned in an alkaline cleaner and then acid etched using a solution of 30% $HNO_3$ and 2% HF at room temperature. A ceramic adhesive was prepared using an alkaline-bore-silicate frit together with molybdic oxide and water. The ceramic adhesive was sprayed on the steel panels to an unfired thickness of approximately 3 mils, and then dried. A lap shear specimen was prepared by taking two of the specimens and placing the sprayed sides of the sheets together with a piece of silver brazing alloy therebetween. A lap shear area of one inch by one-half inch was so produced. The specimen was then placed in a furnace under a load of 22 p.s.i. at a temperature of 1750 degrees F. for a period of 20 minutes.

As previously indicated, in some instances it will be desirable to utilize the frit forming materials alone, rather than smelting them and utilizing the resulting frit.

*Example III*

Frit forming materials can be milled and ground and then mixed together in the percentages as follows: boric acid 66.2%, sodium nitrate 9.0%, powdered quartz 24.8%. The frit forming materials can then be mixed in the ratio of 100 parts by weight of the frit forming materials with various mil additions, such as 150 parts by weight of water and two parts by weight of Syloid 244. The slip can then be sprayed or brushed onto the metal members and an intermediate layer of brazing alloy foil or expanded foil placed therebetween and the structure fired in air at a temperature and for a time to mature the ceramic forming and brazing materials.

In another embodiment of the method of the invention, the brazing alloy is used in the form of powder. In this instance, a suitable frit or frit forming materials of relatively small size, perferably a 200 mesh size or smaller is prepared. The frit is mixed with a brazing alloy which has also been ground to a relatively small size, preferably a 325 mesh size or smaller. The ratio of the ground frit to the ground brazing alloy is variable within the skill of the art, however, a ratio of approximately 1 part by weight of frit to 3–5 parts by weight of brazing alloy has been found satisfactory. A slurry of the combination of powders is then made by using a commercial brazing alloy cement. The resulting slurry is applied to the members to be bonded in any suitable manner, such as by brushing. The system is fired in air at a temperature and for a time to mature the ceramic and brazing materials. The ranges of temperature and time set forth hereinbefore apply here also.

Figure 5:
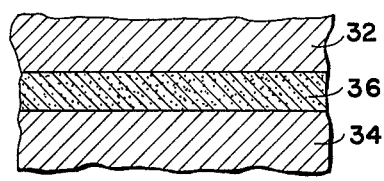
FIG. 5 is an enlarged partial cross section view showing two members in position to be fired utilizing another preferred specific embodiment of the method of the invention.

The last described method is illustrated in FIG. 5 of the drawings wherein the two metallic members 32 and 34 are cleaned and provided with a coat of the slurry described which is shown at 36. The slurry 36 can be brushed on or applied in any suitable manner. In some instances only one of the members need be coated. The brazing alloy cement acts as a carrier for the powders in this instance, and is exhausted during the firing step.

The following examples are given to illustrate the last described embodiment of the invention and are not to limit the scope of the invention.

*Example IV*

Two panels of steel were cleaned by vapor degreasing and immersing in an alkaline cleaner as previously described. A frit made from a composition consisting of 66.2% boric acid, 9.0% sodium nitrate and 24.8% powdered quartz was dry ground to a minus 200 mesh size in a porcelain ball mill. The ground frit was then mixed with a standard nickel base brazing alloy powder which had been ground to a minus 325 mesh size. The powders were mixed in the ratio of 1 part by weight of frit to 4 parts by weight of brazing alloy. A slurry of the combination of powders was made using the commercial brazing alloy cement sold under the trade name Nicrobraz by the Wall Colmonoy Co. of Detroit, Michigan. The slurry was well mixed and then brushed on the steel panels and allowed to dry. The panels were then placed into contact and were fired in an air atmosphere at 2,000 degrees F for 10 minutes. A 25 p.s.i. bond pressure was applied by weights during the firing.

In the preceding example the materials used in making the frit can be mixed directly with the ground brazing alloy instead of first making the frit.

*Example V*

The metallic members to be bonded are cleaned to remove mill greases and the like in any suitable manner. A frit can be made composed of 64.6% boric acid, 1.9% barium carbonate, 5.7% sodium nitrate, 1.9% sodium silico fluoride and 25.8% powdered quartz and ground to a relatively small size, or the frit materials can be utilized as such. The frit or frit forming materials are then mixed with a ground brazing alloy powder and the mixed powders are made into a slurry using a commercial grade brazing alloy cement. The slurry is then brushed or otherwise applied to the members to be bonded. The panels are then fired in air.

In still a further embodiment of the invention a ceramic frit or frit forming materials are ground to a relatively small size preferably to at least a minus 200 mesh size. The frit or frit forming materials are then mixed with other materials to form a suspension, such as by mixing 100 parts by weight of frit or frit forming materials with 150 parts by weight of water and 2 parts by weight of Syloid 244. A brazing alloy is then ground to a relatively small size, preferably minus 325 mesh size, and is mixed with the frit or frit forming materials in suspension. The resulting mixture is then brushed or otherwise applied to one or both of the members to be bonded and they are placed in contact and fired.

The following examples of the embodiment of the invention last described are intended to illustrate and not to limit the invention.

*Example VI*

Two metallic panels to be bonded are vapor degreased and cleaned by immersing in an alkaline cleaner. A frit or frit forming materials composed of 64.4% boric acid, 1.9% sodium silico fluoride, 8.0% sodium nitrate and 25.8% powdered quartz are ground to a minus 200 mesh size and 100 parts by weight of the frit or frit forming materials are mixed with 150 parts by weight of water and two parts by weight of Syloid 244. A brazing alloy having the noble metals as the major ingredient is ground to a minus 325 mesh size and mixed with the solution containing the frit or frit forming materials. The resulting mixture is then brushed on the members to be bonded and the system is fired in air at a temperature and for a time sufficient to mature the mixture.

*Example VII*

The members to be bonded are cleaned in any suitable manner to remove mill grease and the like. A frit of the type described or frit forming materials are ground and a water suspension is made therefrom. A suitable brazing alloy is ground and mixed with the suspension which is then applied to the members to be bonded. The system is then fired in air to mature the bonding material.

Lap-bonded shear test specimens were prepared as described hereinabove and pulled to failure in tension at room temperature. These specimens exhibited substantially improved and superior results when compared to bonds obtained by using common brazing or ceramic procedures.

A comparison of room temperature lap shear strengths on non-heat treated panels are as follows:

(1) 6,000–7,000 p.s.i. on samples prepared using ceramic adhesives and brazing alloy in accordance with the invention.

(2) 2,000–3,000 p.s.i. on the silver braze alone when fired in air at 1750 degrees F. and 22 p.s.i. for 20 minutes.

(3) 400–1,000 p.s.i. for ceramic adhesives alone.

One important value of the ceramic adhesive used in conjunction with the brazing alloy as described is inhibiting the oxidation of the metal being bonded, as well as bonding. The combination ceramic and brazing materials and the bonding methods described results in very good wetting of the surface, and the metal surfaces are bonded with unexpected strength.

Figure 6:
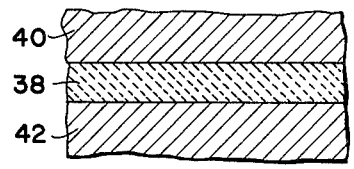
FIG. 6 is an enlarged partial cross section view illustrating the finished product obtained by practicing the method of the invention.

Cross sections of bonded joints made in accordance with the invention are not like normally brazed joints or the joints made by the use of ceramic adhesives alone. The nonconformity of the appearance of these cross sections with the normal results obtained by use of one or the other materials alone indicates a reaction of the ceramic adhesives, brazing alloy and the base metal. The product obtained by the method of the invention is shown in FIG. 6, wherein the ceramic and brazing materials are shown at 38 and the metal member at 40 and 42.

Use of the bonding method as described above results in a considerable cost savings over that used in brazing alone due to the fact that protective atmospheres or vacuums usually required in firing the brazed alloys can be dispensed with.

Also, the bonding method of the invention results in a joint in which the strength of the joint remains good during temperature changes. Furthermore, the brittleness usually associated with ceramic materials is not present, the joint being ductile.

While the invention as described hereinabove can be practiced without the use of protective atmospheres, atmospheres of gases such as argon, hydrogen, helium, dissociated ammonia, nitrogen, and other such atmospheres can be used where desired to reduce scaling on the article being bonded, etc.

As will be evident to those skilled in the art, various modifications of this invention can be made or followed, in the light of this description and discussion, without departing from the spirit of the disclosure or the scope of the claims.

I claim:

1. A method of bonding sheets of steel comprising the steps of, cleaning the members to be bonded by vapor degreasing with a chlorohydrocarbon and further cleaning the members with an alkaline cleaner, spraying a thin wet coat of a ceramic adhesive consisting of a water suspension of fired and ground boric acid, sodium nitrate, and powdered quartz frit on each of the contacting faces of the members to be bonded, said boric acid and said sodium nitrate being present in an amount sufficient to permit bonding to the members, allowing the adhesive to dry, placing a sheet of brazing alloy foil composed of silver, copper and lithium between the members to be bonded and in contact with the coats of ceramic adhesive, said brazing alloy covering the entire contacting faces of the members, placing the members into contact under a pressure of from one to three atmospheres, and firing the structure in air at a temperature of from 1600 to 1800 degrees F. for a time of from 10 to 30 minutes.

2. The method of bonding two metallic members comprising the steps of cleaning the members to be bonded by vapor degreasing, further cleaning the members by immersing in an alkaline cleaner, spraying a thin coat of a ceramic adhesive consisting of a water suspension of a frit composed primarily of boric acid and sodium nitrate and powdered quartz on the contacting faces of the members to be bonded, said boric acid and said sodium nitrate being present in an amount sufficient to permit bonding to the members, allowing the adhesive to dry, placing a sheet of brazing alloy between the members to be bonded, said brazing alloy having a minor ingredient capable of wetting and bonding to said frit selected from a group consisting of indium, lithium, titanium, iron, manganese, metalloids, and mixtures thereof, said brazing alloy having a major ingredient selected from a group consisting of noble metal alloys and nickel-base alloys, placing the members into contact under sufficient pressure to maintain them in contact, and firing the structure in air at a temperature of from 1600 to 2100 degrees F. for a period of time sufficient to mature the adhesive and brazing alloy.

3. The method as recited in claim 2 wherein the brazing alloy is in the form of an expanded foil.

4. The method as recited in claim 2 wherein the brazing alloy has a composition by weight of 80 to 95 parts of silver, 7 to 8 parts of copper, 0 to 3 parts of palladium, and 7 to 9 parts of an ingredient selected from a group consisting of lithium, indium, and mixtures thereof.

5. A method of bonding sheets of metal together comprising the steps of cleaning the members to be bonded, applying an alkaline borosilicate thin coat of a ceramic adhesive to the faces of the members to be bonded in an amount sufficient to permit bonding to the members, allowing the adhesive to dry, placing a brazing alloy between the members to be bonded, said brazing alloy having a major ingredient selected from a group consisting of noble metals and nickel and having a minor ingredient capable of wetting and bonding to said ceramic adhesive selected from a group consisting of indium, lithium, titanium, iron, manganese, metalloids, and mixtures thereof, and placing the members into contact and firing the structure in air at a temperature of 1600 to 2100 degrees F. for a period of time sufficient to mature said ceramic adhesive and said brazing alloy.

6. A method of bonding two metal members together comprising the steps of cleaning the members to be bonded, applying a coat of an alkaline borosilicate ceramic adhesive on the members to be bonded in an amount to permit bonding to the members, placing a brazing alloy between the members to be bonded, said brazing alloy having a major ingredient selected from a group consisting of noble metals and nickel and having a minor ingredient capable of wetting and bonding to said ceramic adhesive, and placing the members into contact and firing the structure at a temperature of 1600 to 2100 degrees F. for a period of time sufficient to mature said ceramic adhesive and said brazing alloy.

7. The method as recited in claim 2 wherein the brazing alloy has a composition by weight of 80 to 93 parts nickel, 0 to 15 parts chromium, 2 to 4 parts boron, and 0 to 7 parts of an ingredient selected from a group consisting of silicon, carbon, titanium, iron, manganese, and mixtures thereof.

8. The method as recited in claim 2 wherein the ceramic adhesive includes a frit having composition by weight of 54 to 67 parts boric acid, 23 to 26 parts powdered quartz, 3 to 9 parts sodium nitrate, 0 to 12 parts borax, and 0 to 8 parts of an ingredient selected from a group consisting of sodium silica fluoride, barium carbonate, lithium fluoride, and mixtures thereof.

References Cited by the Examiner

UNITED STATES PATENTS

| | | |
|---|---|---|
| 2,001,186 | 5/1935 | Dornier. |
| 2,201,001 | 5/1940 | Stuck _____ 29—470 |
| 2,282,106 | 5/1942 | Underwood _____ 29—473.1 XR |
| 2,464,591 | 3/1949 | Larsen et al. _____ 29—500 XR |
| 2,609,068 | 9/1952 | Pajak. |
| 2,696,662 | 12/1954 | LeSech _____ 29—195 |
| 2,713,196 | 7/1955 | Brown _____ 29—504 XR |
| 2,763,919 | 9/1956 | Kempe et al. _____ 29—195 |
| 2,816,355 | 12/1957 | Herman. |
| 2,979,813 | 4/1961 | Steinberg _____ 29—470 |
| 3,030,703 | 4/1962 | Wirsing _____ 29—504 XR |
| 3,045,332 | 7/1962 | Denison _____ 29—472.9 XR |

FOREIGN PATENTS

| | | |
|---|---|---|
| 144,148 | 11/1951 | Australia. |

OTHER REFERENCES

General Electric publication GEA-3193C (a collection of articles published in Iron Age during 1938 and 1939 pages 21 and 31.

Handy & Harmon Technical Bulletin No. T-10.

JOHN F. CAMPBELL, *Primary Examiner.*

WHITMORE A. WILTZ, *Examiner.*